United States Patent

Kao et al.

[11] Patent Number: 6,154,424
[45] Date of Patent: Nov. 28, 2000

[54] CONTROL DEVICE OF A PICKUP HEAD FOR LOCATING THE TRACK POSITION

[75] Inventors: Chih-Hsien Kao, Panchiao; Sheng-Yunn Wang, Tai-ping, both of Taiwan

[73] Assignee: MediaTek, Inc., Taiwan

[21] Appl. No.: 09/069,498

[22] Filed: Apr. 29, 1998

[30] Foreign Application Priority Data

Feb. 27, 1998 [TW]  Taiwan ................................ 87102844

[51] Int. Cl.[7] ........................................................ G11B 7/00
[52] U.S. Cl. ........................................ 369/44.28; 369/44.35
[58] Field of Search .................................. 369/32, 44.25, 369/44.27, 44.28, 44.29, 44.34, 44.35

[56] References Cited

U.S. PATENT DOCUMENTS

| | | | |
|---|---|---|---|
| 5,038,333 | 8/1991 | Chow et al. | 369/44.28 |
| 5,675,558 | 10/1997 | Katoh | 369/44.25 |
| 5,675,562 | 10/1997 | Yanagi | 369/44.28 |
| 5,917,789 | 6/1999 | Iwasaki et al. | 369/44.28 |
| 5,982,721 | 11/1999 | Supino et al. | 369/44.28 |

*Primary Examiner*—Nabil Hindi
*Attorney, Agent, or Firm*—Blakely Sokoloff Taylor & Zafman

[57] ABSTRACT

A control device to locate the pickup head on the desired position yielded by the operation of seek is taken in two parts. The first part is utilizing the velocity control to prevent the fluctuation problem of the bi-mass system and the second part is switching the operation to the mode of position control gradually, so that the pickup head can reach the destination precisely and minimize the problem of fluctuation and increase the successful rate of the tracking control. Moreover, this invention has utilized a feedforward control to properly compensate the steady state error originated from the characteristics of system or friction, a position feedback control and a switching factor to gradually switch between the modes of velocity and position. Thus, the position and velocity of the sled motor can be controlled at the same time to allow the pickup head to reach the destination smoothly as expected by the designed of the velocity profile. The tracking control therefore is done smoothly.

9 Claims, 6 Drawing Sheets

6,154,424

CONTROL DEVICE OF A PICKUP HEAD FOR LOCATING THE TRACK POSITION

CROSS-REFERENCE TO RELATED APPLICATION

This application claims the priority benefit of Taiwan application serial no.87102844, filed Feb. 27, 1998, the full disclosure of which is incorporated herein by reference.

BACKGROUND OF THE INVENTION

1. Field of the Invention

This invention relates to a pickup head of optical disk drive, and more particularly to a feedforward compensation control device by utilizing acceleration and a feedback control device for position to allow the pickup head to be able to move smoothly and obey the designed velocity profile and reach the destination to complete the tracking control easily.

2. Description of Related Art

Due to the continuous promotion of the information technology, the conventional Disks have been gradually replaced by optical disk drive because of their developing technology being limited and the storing capability being not large enough. The optical disk drive has advantages of high capability of storage for storing a large quantity of information and further being able to execute read/write for the present products so that the optical disk drive has been popularly accepted and applied by the users.

However, during the production of the optical disk drive, the part devices including sled motor and transmission device are not able to be made exactly the same and the characteristics of the electronic elements like resistors and capacitors are changing during being in operation. On the other hand, during being in operation, the environmental temperature does also affect the electronic devices, which are used in optical disk drive. Moreover, because of the difference of the optical characteristics of photo sensor and the reflectivity of the optical disk itself, a proper adjustment is needed to avoid the focusing problem and the seek error. FIG. 1 illustrates the structure of the pickup head of an optical disk drive. In the technology of reading the information stored in the optical disk drive, the operation of seek is to move the pickup head to the right position on the track of information. Referring to FIG. 1, the pickup head includes a lens 10, which further includes a laser diode, a photo sensor and other related elements, a sled motor 11 and a tracking coil 12. The operation of seek is done through both the sled motor 11 for carrying the pickup head and the suspension device like the tracking coil 12. From the point of view of control, the plant, that is, the controlled object is belonging to a bi-enabler and a system of bi-mass with low rigidity. The plant is the pickup head. The bi-enabler 112 refers to both the sled motor 11 and the tracking coil 12, and the system of bi-mass means that the lens 10 should be driven by sled motor 11 to move together. This motion of the bi-mass can induce the fluctuation of the position of the lens During the operation of seek, the fluctuation of the lens 10 and the friction of the sled motor 11 itself could cause the fail of tracking control due to over speed after completing the operation of seek and switching to the following-track mode. Referring to the FIG. 2, in the conventional applications of optical disk drive, the method to yield the signals has taken advantages of the laser diode of pickup head to emit the laser beam which produces a Focusing Point on the optical disk and then is reflected back to the photo sensor 13 on the pickup head. After receiving the reflected laser beam, the photo sensor 13 yields six signals as A, B, C, D, E, and F for producing signals of tracking error (TE), focusing error (FE), and radio frequency (RF) etc., of which the signals are treated as the input of a control system 14 to yield the signal for doing the track crossing.

FIG. 3 illustrates the flow diagrams of a conventional velocity control. The operation of seek in a conventional optical disk drive intuitively is a control system of position, but during the control operation, the sled motor is continuously accelerated and results in the continuous fluctuation of the pickup head. This means that the position is not easy to be located. In other word, the operation of seek becomes more difficult. Therefore in general a control system of velocity is taken to assist the operation of seek.

According to the conventional method, a velocity profile 20 is designed first and the sled motor is accelerated or decelerated according to the velocity profile 20 so that the sled motor can be more smoothly accelerated or decelerated to reduce the fluctuation of pickup head. The flow of the velocity control is done through an adder which is receiving the outputs of the velocity profile 20 and a velocity estimator from the plant 22 and exporting an output for a velocity controller 21. The "+" and "−" mean the plus and subtraction of the indicated quantities, respectively. Here, there is a problem of steady state error still existing for the velocity control. As shown in FIG. 3, when the velocity controller C(s) 21 is a scalar k, the steady state error of the input I(s) in Laplace's operation can be expressed as $$E = \lim_{s \to 0} s \cdot \frac{1}{1 + kP(s)} \cdot I(s). \tag{1}$$

Assume that the transfer function P(s) of the plant 22 as shown in FIG. 3 can be expressed as $$P(s) = \frac{a}{Js + b}, \tag{2}$$

where J represents the inertia moment, b represents viscous friction coefficient, and a represents the DC gain constant of the plant 22. If the input is a step function then I(s) can be expressed as $$I(s) = \frac{R}{s}, \tag{3}$$

where R represents the amplitude. Then the steady state error can be expressed as $$E = \lim_{s \to 0} s \cdot \frac{Js + b}{Js + b + ka} \cdot \frac{R}{s} = \frac{bR}{b + ka}. \tag{4}$$

If the input is a ramp function, then I(s) can be expressed as $$I(s) = \frac{R}{s^2}. \tag{5}$$

Then when the time has approached to infinite, the steady state error is expressed as $$E = \lim_{s \to 0} s \cdot \frac{Js+b}{Js+b+ka} \cdot \frac{R}{s^2} \to \infty. \quad (6)$$

The description above is under the case that the viscous friction coefficient is taken into account, If the viscous friction coefficient approaches to zero or small (b→0), then equation (4) (step function input) is zero and equation (6) (ramp function input) has a finite result as $$E = \lim_{s \to 0} s \cdot \frac{Js+b}{Js+b+ka} \cdot \frac{R}{s^2} = \frac{JR}{ka}. \quad (7)$$

As the derivation described above, if the input function corresponding to the velocity profile in FIG. 4 is taken, then no matter whether the viscous friction coefficient does exit or not the error of control does always exist. FIG. 4 is an ideal velocity profile. After a certain time of operation, the steady state error is inevitable even though it isn't infinite as the result of equation (6). This steady state error E causes that the pickup head completes the operation not obeying the design of velocity profile Vc but obeying a similar velocity profile Vn as shown in FIG. 5, and then results in a fall of tracking control due to over speed while the control of the operation of seek does switch to the mode of following-track.

Summarizing the descriptions above, the conventional technology has some drawbacks as follows:

1. While the pickup head does the operation of seek for positioning, the conventional method as the position control would induce the fluctuation of the lens suspending on the pickup head and increase the difficulty of the control because the method can not directly control the acceleration and deceleration of the sled motor which is carrying and holding the pickup head.

2. If the conventional method of the velocity control is applied, even though the variation of velocity is able to be controlled to smooth the fluctuation of lens, the steady state error is still a problem and cause an increase of the fail rate of tracking control due to the over speed of the pickup head, while the control has been switched to the mode of following-track after reaching on the track number after the operation of seek.

SUMMARY OF THE INVENTION

It is therefore an objective of the present invention to provide a control device for locating the pickup head on the position yielded by the operation of seek in that the pickup head during the whole operation of seek is done by applying the first part of control on the velocity and then the following part of control to gradually switch to the mode of the position control by utilizing a switching factor to gradually switch between the velocity control mode and position control mode; wherein both the position and velocity of the sled motor can be controlled at the same time to reach the destination precisely and solve the problem of the difficulty control due to the conventional fluctuation being too big.

It is another an objective of the present invention to provide a device for locating the pickup head on the position yielded by the operation of seek. The device has utilized a feedforward control to properly compensate the conventional steady state error because of the characteristics of system or the friction and allow the pickup head to be able to move smoothly to reach the destination and complete the tracking control operation obeying the designed velocity profile.

In accordance with the foregoing and other objectives of the present invention, a device for locating the pickup head on the position yielded by the operation of seek is taken first part by utilizing the velocity control to prevent the fluctuation problem of the bi-mass system and following part by switching to the mode of position control gradually, so that the pickup head can reach the destination precisely and minimize the problem of fluctuation and increase the successful rate of the tracking control.

Moreover, this present invention has utilized a feedforward control to properly compensate the steady state error, which is from the characteristics of system or friction, and a position feedback control and a switching factor to gradually switch between the modes of velocity and position in that both the position and velocity of the sled motor can be controlled at the same time to let the pickup head be able to reach the destination smoothly as the expectation of the designed velocity profile and complete the tracking control smoothly either.

BRIEF DESCRIPTION OF DRAWINGS

The invention can be more fully understood by reading the following detailed description of the preferred embodiments, with reference made to the accompanying drawings as follows.

DETAILED DESCRIPTION OF PREFERRED EMBODIMENTS

The invention provides preferred embodiments to overcome the conventional problems as described above, during the operation under the mode of seek, a device has been taken first part by utilizing the velocity control to prevent the fluctuation problem of the bi-mass system and following part by switching to the mode of position control gradually to reach the destination precisely and minimize the problem of fluctuation either. Moreover an acceleration feedforward compensation is utilized to reduce the steady state error originating from the operation of the velocity control.

Figure 6:
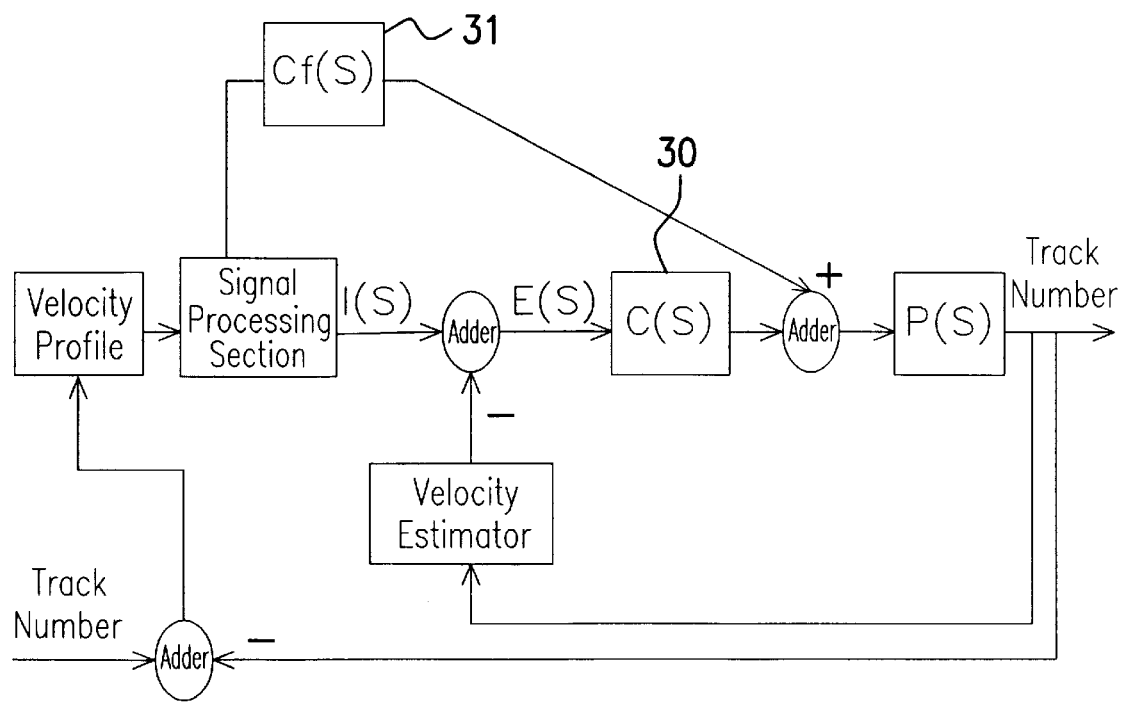
FIG. 6 illustrates the diagrams of system with the feedforward compensation being added.
Figure 7:
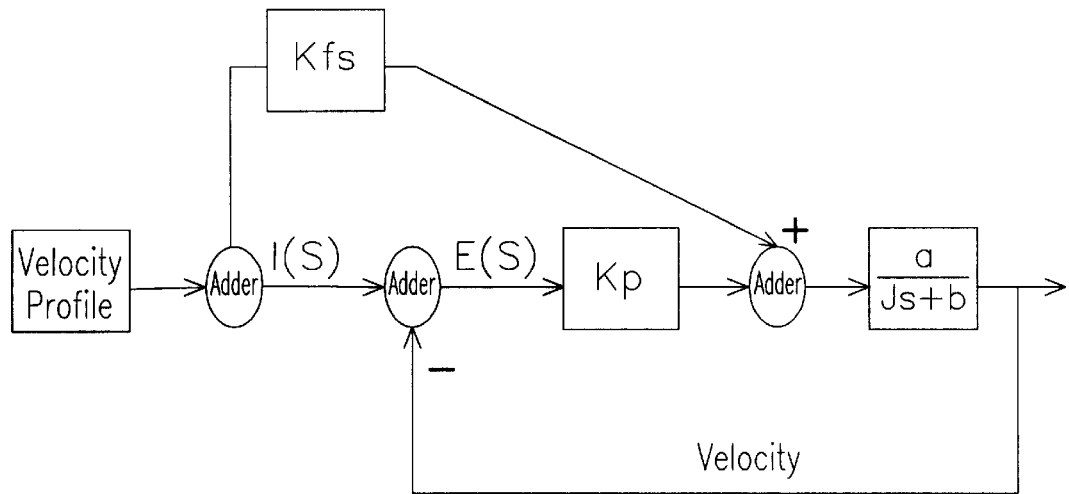
FIG. 7 illustrates the diagrams with the feedforward compensation being added.

First, under that the acceleration feedforward compensation mode called as the first mode hereafter has been considered, the flow diagrams of control are illustrated in FIG. 6. After the substitutions of the controller of position C(s) 30 as the Kp and the feedforward compensator Cf(s) 31 as the Kfs in FIG. 6, the new flow diagrams of control with substitutions are illustrated in FIG. 7. An adder + is to add the output, Kfs. An adder− is to subtract the feedback of velocity. While the input is a step function, from equation (3), the steady state error E can be expressed as:

$$E = \lim_{s \to 0} s \cdot \frac{(J - a \cdot Kf)s + b}{Js + b + a \cdot Kp} \cdot \frac{R}{s} = \frac{bR}{b + a \cdot Kp}, \quad (8)$$

where J represents the inertia moment, b represent the viscous friction coefficient, a represents the DC gain Constant of the plant, and R represents the amplitude. While the input is a ramp function, from equation (5), the steady state error E can be expressed as:

$$E = \lim_{s \to 0} s \cdot \frac{(J - a \cdot Kf)s + b}{Js + b + a \cdot Kp} \cdot \frac{R}{s^2} \to \infty. \quad (9)$$

Considering the cases of b being small or zero, equation (8) is equal to zero and equation (9) is equal to zero when Kf=J/a, by the understanding from equation (10), $$E = \lim_{s \to 0} s \cdot \frac{(J - a \cdot Kf)s + b}{Js + b + a \cdot Kp} \cdot \frac{R}{s^2} = \frac{(J - a \cdot Kf) \cdot R}{a \cdot Kp}. \quad (10)$$

Figure 8:
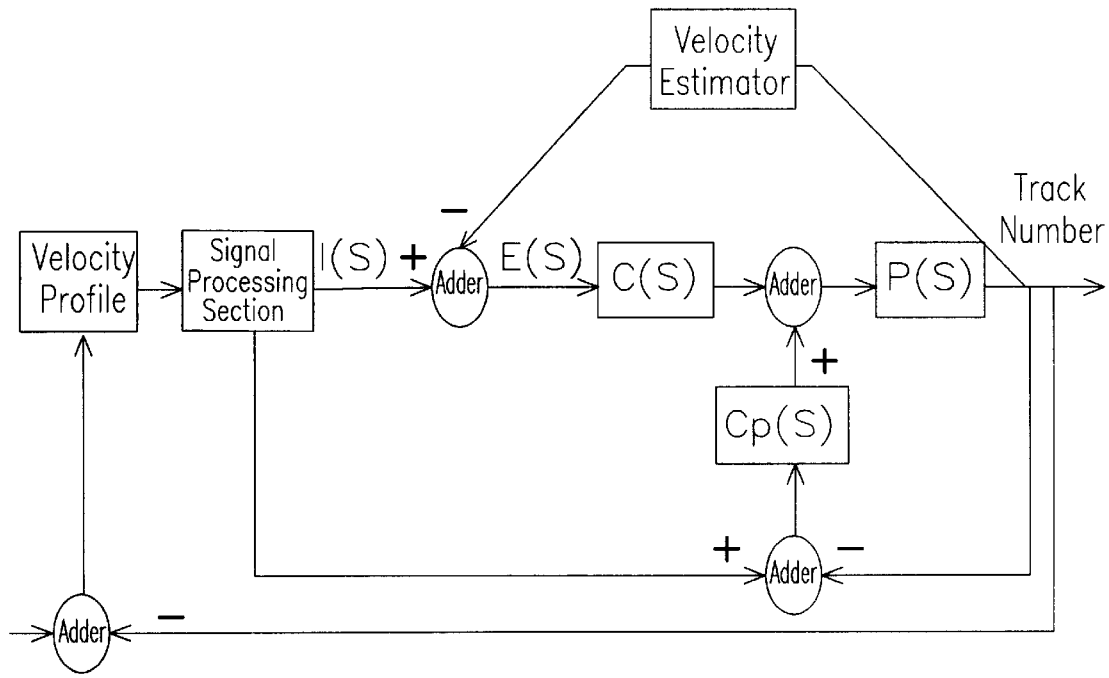
FIG. 8 illustrates the diagrams of system with the position compensation being added.
Figure 9:
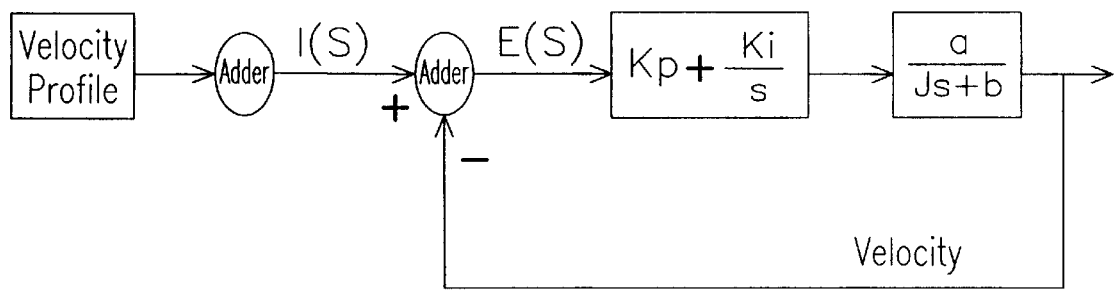
FIG. 9 illustrates the diagrams with the position compensation being added.

If we add a route of position feedback to the system, then the system can behave similarly to the PI control system as illustrated in FIG. 8 and is called as the second mode hereafter. If the relations of C(s)=Kp and Cp(s)=Ki are substituted in FIG. 8, then it can be represented as the diagrams illustrated in FIG. 9, in which the steady state error E can be expressed as $$E = \lim_{s \to 0} s \cdot \frac{1}{1 + \frac{Kps + Ki}{s} \cdot P(s)} \cdot I(s). \quad (11)$$

When the input is a step function the steady state error E becomes $$E = \lim_{s \to 0} s \cdot \frac{s \cdot (Js + b)}{Js^2 + (b + a \cdot Kp) \cdot s + a \cdot Ki} \cdot \frac{R}{s} = 0. \quad (12)$$

When the input is a ramp function the steady state error E becomes $$E = \lim_{s \to 0} s \cdot \frac{s \cdot (Js + b)}{Js^2 + (b + a \cdot Kp) \cdot s + a \cdot Ki} \cdot \frac{R}{s^2} = \frac{b \cdot R}{a \cdot Ki}. \quad (13)$$

When the viscous friction coefficient b→0, both equation (12) and (13) are equal to zero.

In the application of an optical disk drive, in general the viscous friction coefficient of the sled motor is quite small. The friction is mainly from the part of the transmission device. According to the above discussions, a preferred strategy is that a velocity control is taken for the first part of control, then a switching to the mixing control of velocity and position is taken for the following part of control, so that the problem of the steady state error can be solved in that the destination can be reached precisely. In addition, even the effect of viscous friction mechanism has strongly appeared, the switching from the first mode to the second mode is available to reduce the steady state error from the infinite, in equation (6), down to a finite of bR/aKi in equation (13).

Figure 10:
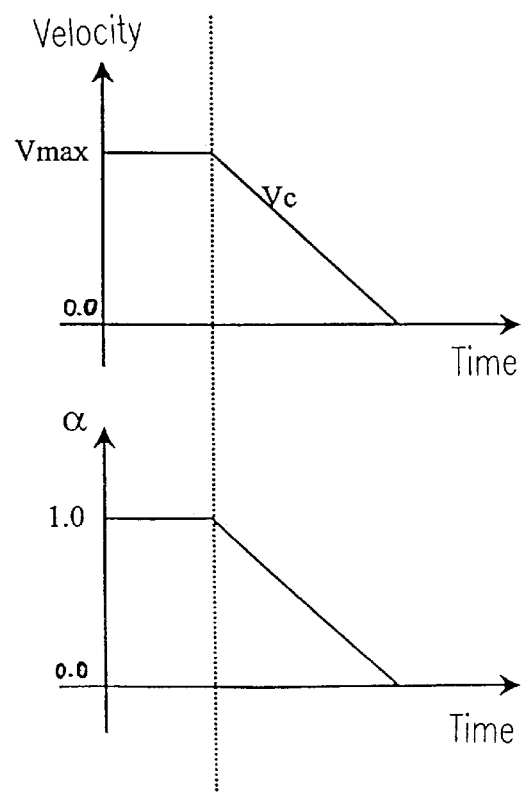
FIG. 10 illustrates the variation of the switching factor during the mode of seek and the velocity profile.

To smoothly complete the switching between those two modes, the system needs a switching factor α to gradually do the switching between velocity mode and position mode. The variation of α versus the time for the whole operation is illustrated in FIG. 10. It varies from a maximum, one unit, to a minimum, zero, linearly and has a correlation with the velocity Vc.

Figure 11:
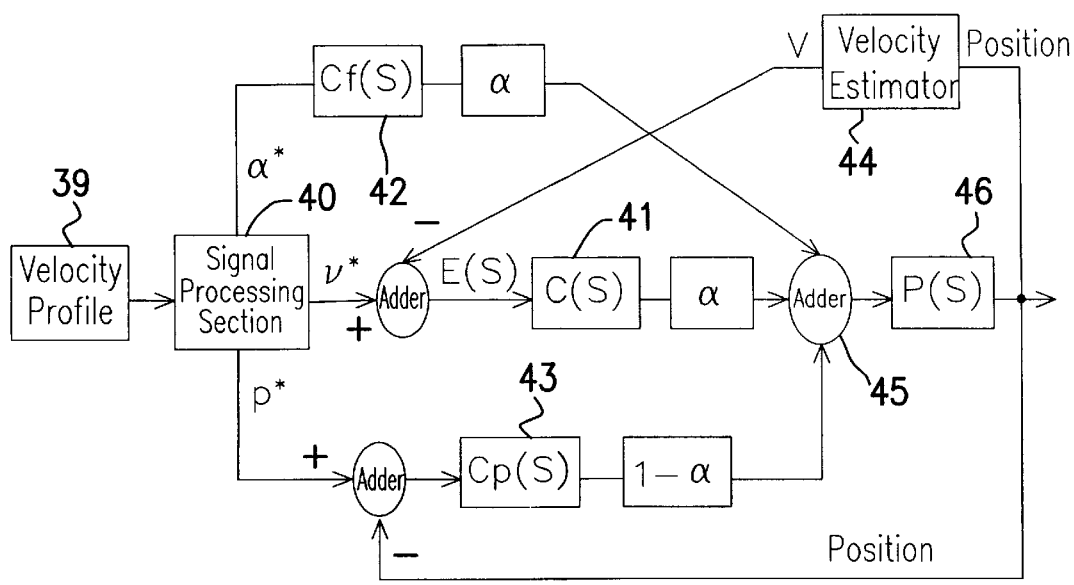
FIG. 11 illustrates the diagrams of a full structure of control according to the preferred embodiments of this invention.
Figure 12D:
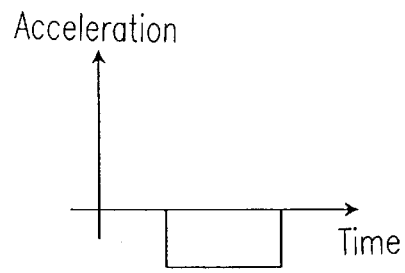
FIG. 12D illustrates the curve of acceleration versus time.
Figure 12A:
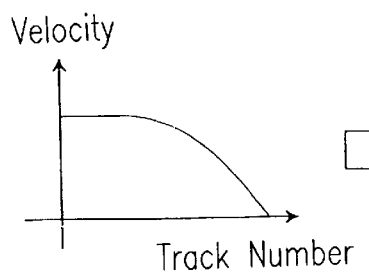
FIG. 12A illustrates the curve of velocity versus the track number.
Figure 12B:
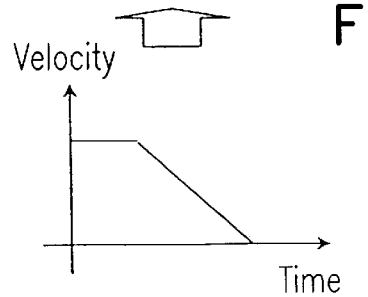
FIG. 12B illustrates the curve of velocity versus the time.
Figure 12C:
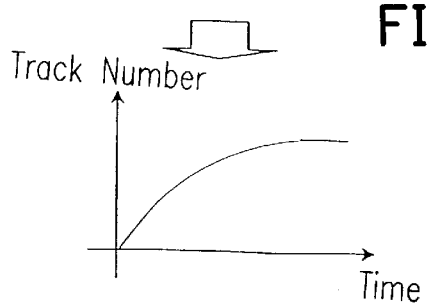
FIG. 12C illustrates the curve of the track number versus the time.

FIG. 11 illustrates the full structure of control of the system according to this present invention. In FIG. 11, through a number of adders for doing plus, +, and subtraction,−, the pre-signal-processing-section 40 of the velocity track is able to transform the velocity vs. track-number as illustrated in FIG. 12A of velocity profile 39 to three different profiles of velocity vs. time as illustrated in FIG. 12B, track-number vs. time as illustrated in FIG. 12C, and acceleration vs. time as illustrated in FIG. 12D. The pre-signal-processing-section 40 then becomes the input of the velocity controller C(s) 41 and the position controller Cp(s) 43, indirectly, and the input of the feedforward compensator Cf(s) 42, directly, to achieve the purpose of the compensation of the steady state error and the mixing switching control between velocity and position. The input of the velocity controller C(s) 41 is the quantity after the subtraction of estimated velocity from the transformed velocity outputting from the signal processing section 40. The input of the feedforward compensator Cf(s) 42 is the transformed acceleration outputting from the signal processing section 40. And, the input of the position controller Cp(s) 43 is the quantity after the subtraction of practical position from the transformed position outputting from the signal processing section 40.

In addition, the velocity estimator 44 is for the estimation of the crossing track velocity of pickup head. After the processing of the velocity controller C(s) 41, the feedforward compensator Cf(s) 42, and the position controller Cp(s) 43 the result is sent to a adder 45 for a combined operation by the velocity estimator 44. Then the adder 45 sends its result to the plant P(s) 46. Finally, the plant control server (not illustrate in the FIG.) would control the pickup head to be moved to the destination track. Wherein the result for the input of adder 45 has included an output of velocity controller C(s) 41 timed by a switching factor α, an output of position controller Cp(s) 43 timed by a switching factor α, and an output of feedforward compensator Cf(s) 42 timed by a switching factor 1-α to allow the switching between velocity mode and position mode to be gradually done. The variation of switching factor α for the whole operation is varying from a unit down to zero, linearly, as illustrated in FIG. 10.

Figure 1:
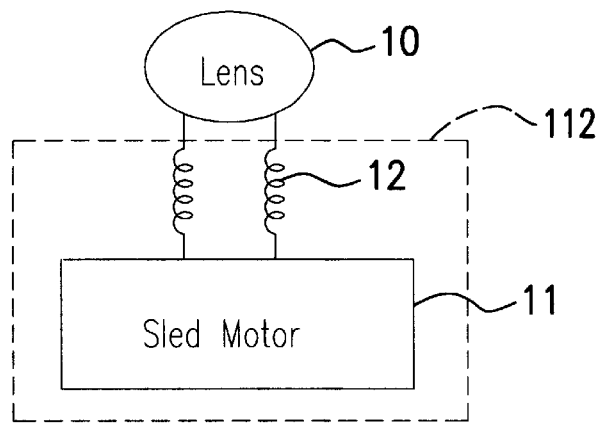
FIG. 1 illustrates the structure of the pickup head of an optical disk drive.
Figure 2:
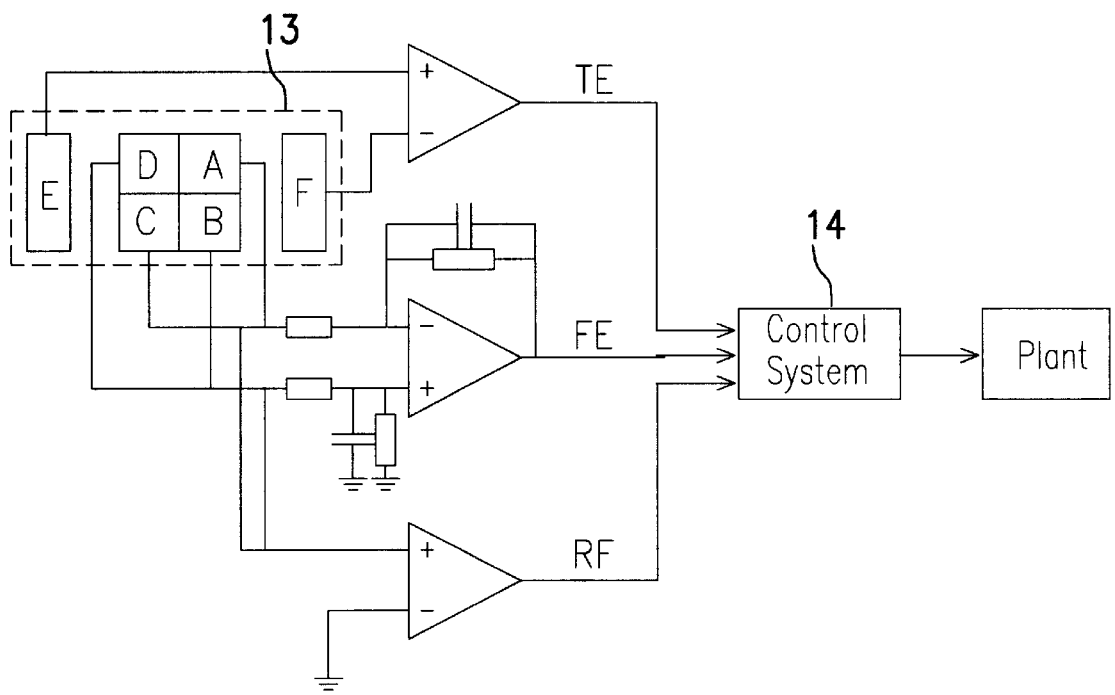
FIG. 2 illustrates the structure of photo sensor.
Figure 3:
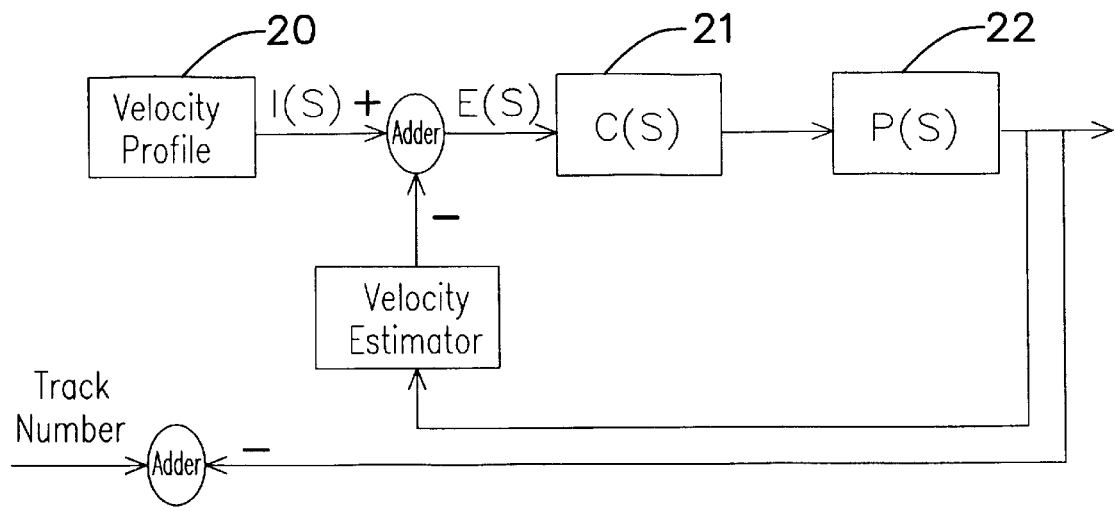
FIG. 3 illustrates the flow diagrams of a conventional velocity control.
Figure 4:
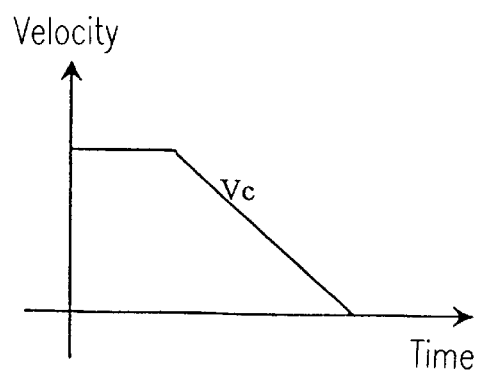
FIG. 4 illustrates an ideal velocity profile.
Figure 5:
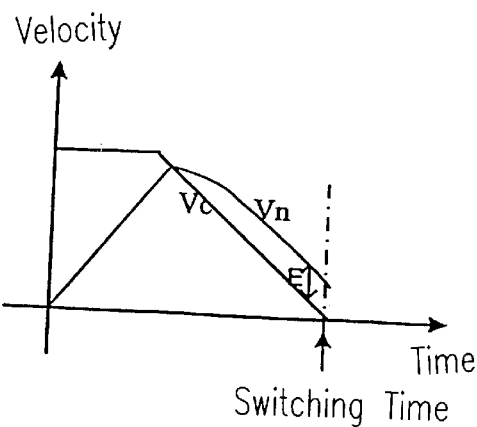
FIG. 5 illustrates the comparison between the ideal velocity profile and the practical velocity profile.

Basically, the following track control of an optical disk drive means that the pickup head is controlled to move to the position of the desired track number. The control mechanism is a bi-input control mechanism. It is desired that the pickup head can be moved to the destination precisely and have a proper slow velocity to reach the destination, as illustrated in FIG. 4 to increase the successful rate of the tracking control operation.

On the other hand, the invention utilizes the acceleration feedforward compensation control (the first mode) and the position feedback control (the second control), and the switching factor for switching between these two mode smoothly. The control both on the position and velocity of sled motor at the same time, therefore, can solve the conventional problems.

Moreover, the invention is also able to control the two degrees of freedom of velocity and the position (or track number) at the same time, and utilize the feedforward control to properly compensate the steady state error coming from the friction or characteristics of system itself, and then the pickup head is able to smoothly move obeying the velocity profile as expected from design and finally be able to reach the destination to complete the tracking control smoothly either.

In conclusion, the invention about a pickup head used in optical disk drive to seek and locate the track number has advantages as follows:

1. During the operation of seek of a pickup head, first part utilizing the velocity control to prevent the fluctuation problem of the bi-mass system and following part switching to the mode of position control gradually, so that the pickup head can reach the destination precisely and minimize the problem of fluctuation and increase the successful rate of the tracking control;

2. Utilizing the feedforward control to properly compensate the steady state error coming from the friction or characteristics of system itself and to let the pickup head be able to smoothly move obeying the velocity profile as expected from design and finally be able to reach the destination to complete the tracking control smoothly; and 3. Utilizing the switching factor for switching between these two modes smoothly, and therefore the control both on the position and velocity of sled motor at the same time to solve the conventional problems.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A control device of a pickup head for locating track position, the pickup head included in a plant which is a controlled object, the control device of the pickup head comprising:

a velocity controller for receiving a velocity error and producing an output of the velocity controller;

a position controller for receiving a position error and producing an position output of the position controller;

a feedforward compensator for receiving a pre-determined acceleration and producing an acceleration compensation error; and an adder, coupled to the velocity controller, the position controller, and the feedforward compensator, for combining the output of the velocity controller, the output of the position controller, and the acceleration compensation error of the feedforward compensator to yield a combined result that is utilized to control the pickup head mounted on the plant.

2. The control device of claim 1, further comprising:

a first switching factor device, located between the velocity controller and the adder, wherein the first switching factor device having a first switching factor, the first switching factor varying from a maximum quantity to a minimum quantity gradually, the first switching factor device used for receiving the output of the velocity controller and causing the output of velocity controller to be timed by the first switching factor and then to be a first input of the adder;

a second switching factor device, located between the position controller and the adder, wherein the second switching factor device having a second switching factor, the second switching factor varying from a maximum quantity to a minimum quantity gradually, the second switching factor device used for receiving the output of the position controller and causing the output of position controller to be timed by the second switching factor and then to be a second input of the adder; and a third switching factor device, located between the feedforward compensator and the adder, wherein the third switching factor device having a third switching factor, the third switching factor varying from a maximum quantity to a minimum quantity gradually, the third switching factor device used for receiving the output of the feedforward compensator and causing the output of feedforward compensator to be timed by the third switching factor and then to be a third input of the adder.

3. The control device of claim 1, further comprising: a signal processing section for transforming a velocity profile into a pre-determined velocity, a pre-determined position, and the pre-determined acceleration, the velocity error being the difference between the pre-determined velocity and a practically estimated velocity, the position error being the difference between the pre-determined position and a practically estimated position.

4. The control device of claim 3, wherein the practically estimated velocity is estimated by a velocity estimator.

5. The control device of claim 1, wherein the pickup head is further comprising:

a lens;

a laser diode for emitting a laser beam onto an optical disk; and a photo sensor for receiving the laser beam after the laser beam being reflected and therefore reading a information of the optical disk.

6. A control device of a pickup head, the pickup head included in a plant, which is a controlled object, the control device of a pickup head comprising:

a velocity controller for receiving a velocity error and producing an output of the velocity controller;

a position controller for receiving a position error and producing an output of the position controller;

a feedforward compensator for receiving a pre-determined acceleration and producing an acceleration compensation error;

an adder, coupled to the velocity controller, the velocity controller, and the feedforward compensator, for combining the output of the velocity controller, the output of the position controller, and the acceleration compensation error of the feedforward compensator to yield a combined result that is utilized to control the pickup head mounted on the plant;

a first switching factor device, located between the velocity controller and the adder, wherein the first switching factor device having a first switching factor, the first switching factor varying from a maximum quantity to a minimum quantity gradually, the first switching factor device used for receiving the output of the velocity controller and causing the output of velocity controller to be timed by the first switching factor and then to be a first input of the adder;

a second switching factor device, located between the position controller and the adder, wherein the second switching factor device having a second switching factor, the switching factor varying from a maximum quantity to a minimum quantity gradually, the second switching factor device used for receiving the output of the position controller and causing the output of position controller to be timed by the second switching factor and then to be a second input of the adder; and a third switching factor device, located between the feedforward compensator and the adder, wherein the third switching factor device having a third switching factor, the switching factor varying from a maximum quantity to a minimum quantity gradually, the third switching factor device used for receiving the output of the feedforward compensator and causing the output of feedforward compensator to be timed by the third switching factor and then to be a third input of the adder.

7. The control device of claim 6, further comprising: a signal processing section for transforming a velocity profile into a pre-determined velocity, a pre-determined position, and the pre-determined acceleration, the velocity error being the difference between the pre-determined velocity and a practically estimated velocity, the position error being the difference between the pre-determined position and a practically estimated position.

8. The control device of claim 7, wherein the practically estimated velocity is estimated by a velocity estimator.

9. The control device of claim 6, wherein the pickup head is further comprising:

a lens;

a laser diode for emitting a laser beam onto an optical disk; and a photo sensor for receiving the laser beam after the laser beam being reflected and therefore reading a information of the optical disk.

* * * * *